July 11, 1961  W. D. PETERS  2,992,078
LIQUID LEVEL MEASUREMENT AND CONTROL
Filed Dec. 20, 1956
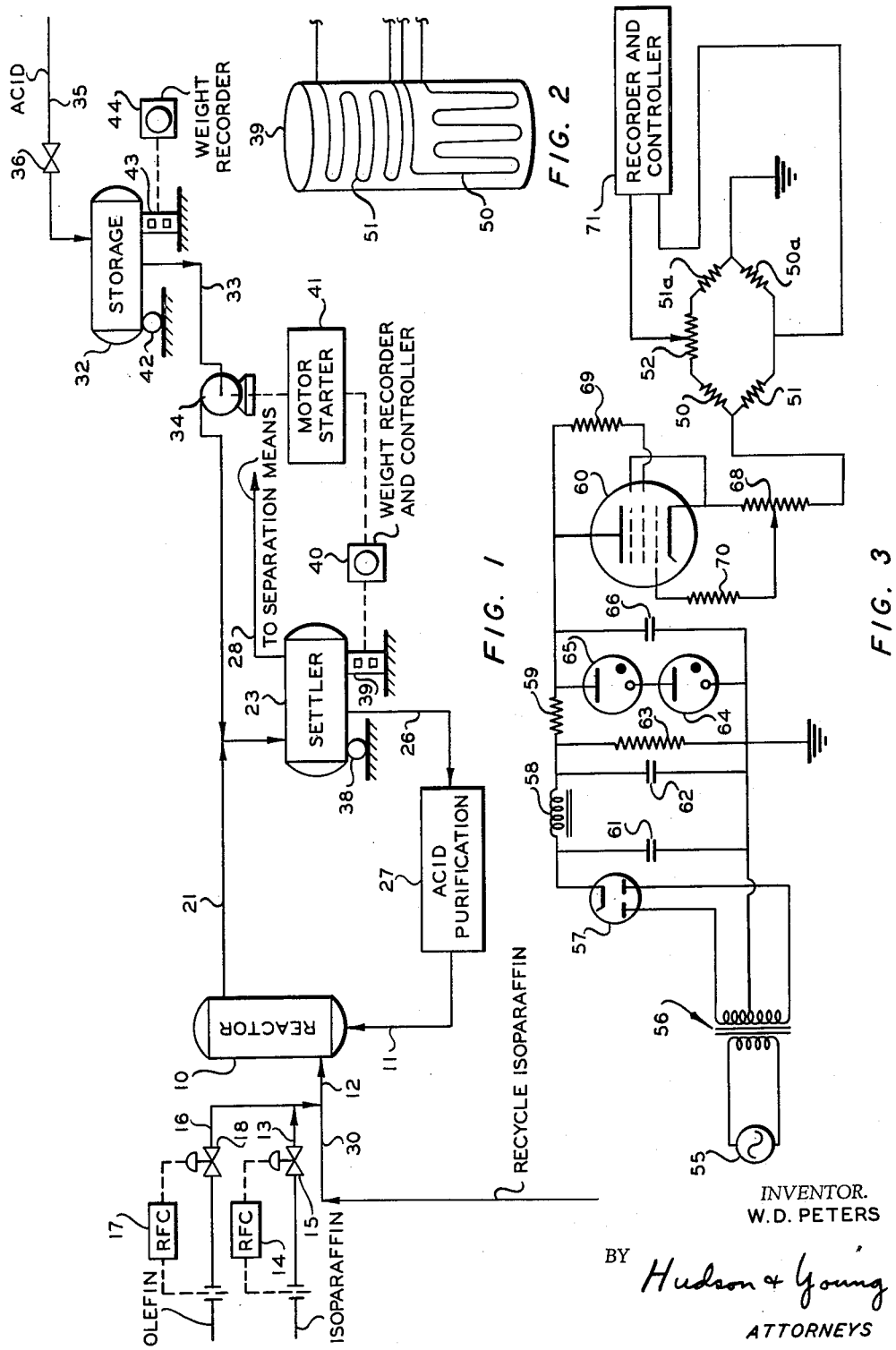
INVENTOR.
W.D. PETERS
BY Hudson & Young
ATTORNEYS United States Patent Office 2,992,078
Patented July 11, 1961

2,992,078
LIQUID LEVEL MEASUREMENT AND CONTROL
William D. Peters, Bartlesville, Okla., assignor to Phillips Petroleum Company, a corporation of Delaware
Filed Dec. 20, 1956, Ser. No. 629,695
4 Claims. (Cl. 23—260)

This invention relates to apparatus for measuring liquid levels in containers. In another aspect it relates to an improved control system for alkylation processes.

The demand for large volumes of high quality gasolines has brought about the development of a number of processes for the conversion of non-gasoline range hydrocarbons into high octane blending stocks. One of these processes, the alkylation of light olefins, such as propylenes and butylenes, with isobutane, using liquid hydrofluoric acid as the catalyst, has proved to be particularly effective in producing alkylates for aviation and motor fuel blending. The hydrocarbons and the liquid hydrofluoric acid are contacted in a reactor, and the effluent from the reactor is directed to a settler to separate the hydrocarbon phase from the acid. The acid is purified and recycled back to the reactor. The hydrocarbon phase is separated into several constituents, including the alkylate product.

In accordance with the present invention, an improved control system for such an alkylation process is provided. It is necessary that some fresh acid be added to the system in order to compensate for acid losses in the separating and purifying means. This acid addition is performed automatically by the apparatus of the present invention which weighs the settler tank and adds acid from a storage container at a rate so as to maintain a predetermined acid level in the settler. The weighing measurement preferably is made by the use of a tank support element having a strain gauge bonded thereto. Any difference in acid level changes the strain on the support element and the resistance of the strain gauge so as to provide an output electrical signal which is representative of the weight of fluid in the tank. This signal can readily be calibrated to provide a direct indication of the hydrofluoric acid level in the tank.

Accordingly, it is an object of this invention to provide an improved control system for an alkylation process.

Another object is to provide apparatus for measuring liquid levels in containers.

A further object is to provide a control system to add liquid acid catalyst to an alkylation process automatically to maintain a predetermined amount of acid in the process.

Other objects, advantages and features of the invention should become apparent from the following detailed description which is taken in conjunction with the accompanying drawing in which:

FIGURE 1 is a schematic representation of a hydrofluoric acid alkylation process having the control system of this invention incorporated therein.

FIGURE 2 is a schematic representation of a strain gauge element employed to measure the hydrofluoric acid in the settler of FIGURE 1.

FIGURE 3 is a schematic circuit drawing of the strain gauge measuring apparatus.

Referring now to the drawing in detail and to FIGURE 1 in particular, there is shown an alkylation reactor 10 which has an inlet conduit 11 communicating therewith to supply liquid hydrofluoric acid. Reactor 10 is provided with a cooling coil, not shown. A hydrocarbon feed stream is introduced into reactor 10 through a conduit 12. A feed stream of isoparaffins, such as isobutane, is supplied to inlet conduit 12 through a conduit 13. The flow through conduit 13 is regulated by a flow controller 14 which adjusts a valve 15. An olefin feed stream, which can be a mixture of propylene and butylenes for example, is supplied to conduit 12 through a conduit 16. The flow through conduit 16 is regulated by a flow controller 17 which adjusts a valve 18. The alkylation reaction is completed in reactor 10 by intimately contacting the hydrocarbons with the hydrofluoric acid catalyst. The hydrofluoric acid-hydrocarbon reaction mixture is removed from reactor 10 through a conduit 21 which communicates with a settler 23. The acid phase in settler 23 is withdrawn through a conduit 26 which communicates with an acid purification unit 27. All, or a part, of this acid is purified in unit 27 by distilling the acid from water and acid soluble oils. A by-pass conduit, not shown, can be connected around unit 27. The purified acid is returned to reactor 10 through conduit 11. The ratio of acid to hydrocarbons supplied to reactor 10 is generally maintained at a selected level between approximately 0.2:1 to 1:1 parts by weight.

The hydrocarbon phase, which contains some soluble hydrofluoric acid, is removed through a conduit 28 which communicates with a suitable separation means, not shown. The separating means can be fractionation columns that are adapted to separate the hydrocarbon effluent from reactor 10 into various constituents. The unreacted isoparaffins are separated by this means and recycled through a conduit 30 which communicates with inlet conduit 12 of reactor 10.

Because some hydrofluoric acid is lost in the separation means and in the acid purification unit, it is necessary to add fresh acid to the system to make up for the losses. This fresh acid is supplied from a storage tank 32 which is connected to settler 23 by means of a conduit 33 that has a pump 34 therein. Acid is supplied to storage tank periodically through a conduit 35 which has a valve 36 therein.

In accordance with the present invention, pump 34 is energized in response to a measurement of the acid level in settler 23 so as to maintain a desired level therein. This is accomplished by continuously weighing settler 23. One end of settler 23 is pivotally mounted on a support 38, and the second end rests on a stationary support member 39. A strain gauge assembly is mounted on support member 39 to provide an indication of the weight supported by this member. The output signal of the strain gauge assembly actuates a weight recorder and controller 40 which, in turn, energizes a motor starter unit 41 to energize pump 34. Pump 34 is thus actuated so as to supply additional acid at a rate sufficient to maintain a constant level of acid in settler 23. Settler 23 is maintained full of fluid so that the weight of the tank is representative of the acid level, the acid being more dense than the hydrocarbon phase. Conduit 28 removes overflow hydrocarbon so that tank 23 remains full.

Storage tank 32 is similarly pivotally mounted on a support 42 and rests upon a stationary support member 43. Support member 43 has a strain gauge assembly thereon which energizes a weight recorder 44 to provide a permanent record of the acid in storage tank 32, and thus the fresh acid added to the system.

A suitable support member 39, which can be employed in the control system of this invention, is illustrated schematically in FIGURE 2. This support member comprises a steel bar which has one or more strain gauges bonded thereto. A first strain gauge 50 is mounted on support 39 so that the wires extend longitudinally of the support. A second strain gauge 51 is bonded to support 39 so that the wires extend transversely of the support. These strain gauges and balancing resistors 50a and 51a are connected in a bridge network as illustrated in FIGURE 3. Gauges 50 and 51 are connected in adjacent arms of the network, as are balancing resistors 50a and 51a. A potentiometer 52 is connected between strain gauge 50 and balancing resistor 51a.

The bridge network is energized from a direct current source which is also illustrated in FIGURE 3. An alternating current source 55 is connected across the primary winding of a transformer 56. The end terminals of the secondary winding are connected to the respective anodes of a double diode 57. The cathode of diode 57 is connected through an inductor 58 and a resistor 59 to the anode of a pentode 60. The center tap of the secondary winding of transformer 56 is connected to ground. Filter capacitors 61 and 62 are connected between ground and the respective end terminals of inductor 58. A resistor 63 is connected in parallel with capacitor 62. Voltage regulating tubes 64 and 65 are connected in series relationship between ground and the anode of pentode 60. A filter capacitor 66 is connected in parallel with tubes 64 and 65. The cathode and suppressor grid of pentode 60 are connected through a potentiometer 68 to the junction between strain gauges 50 and 51. A resistor 69 is connected between the screen grid and anode of pentode 60. A resistor 70 is connected between the control grid of pentode 60 and the contactor of potentiometer 68. The junction between resistors 50a and 51a is connected to ground. The contactor of potentiometer 52 is connected to the first input terminal of a recorder-controller 71. The junction between strain gauge 51 and resistor 50a is connected to the second input of recorder 71.

The circuit illustrated in the left hand portion of FIGURE 3 comprises a conventional direct current power supply wherein the current supplied to the bridge network can be adjusted by means of potentiometer 68. The bridge network comprises a modified form of Wheatstone bridge. The signal applied to recorder 71 is thus representative of changes in the resistance of strain gauge 50, due to different compression forces applied to support member 39. Any change in the compression force applied to support member 39 tends to change the elongation of the wires of strain gauge 50 to change the resistance thereof. Strain gauge 51 is not sensitive to changes in compression force on support 39 and is provided to compensate for any temperature changes. The strain gauges can be conventional instruments which normally are formed of alloys of nickel and copper, and comprise thin diameter wires which are bonded onto the metal support. Recorder 71 is calibrated so as to provide a signal which is representative of the weight of settler 23. This, in turn, is representative of the acid level in settler 23. It should be evident that other types of strain gauge circuits, A.C. for example, can also be employed. Also, more than one strain gauge support can be employed to weigh settler 23. The tank can be supported entirely by strain gauge assemblies which are totaled to obtain the tank weight. Support 43 and its associated strain gauges can be identical to support 39.

Whenever the acid level in settler 23 falls to less than a predetermined height, controller 40 energizes a motor starter 41 to actuate pump 34 to supply additional acid. Controller 40 can be an on-off type unit and motor starter 41 can be a relay which connects a power source to an electrically operated pump 34.

As a specific example of this invention, reactor 10 is operated at 90° F. and at a sufficient pressure to maintain a liquid state. The ratio of isobutane to olefin supplied to reactor 10 based on parts by weight is 6:1. Hydrofluoric acid of 92 weight percent purity is employed as the catalyst. This acid is supplied to reactor 10 at a ratio of ½:1 based on catalyst to hydrocarbon parts by weight. The compositions and flow rates through the several conduits are as follows:

|  | Conduit | | | |
| --- | --- | --- | --- | --- |
|  | 16 | 13 | 30 | 28 |
| Propylene | 2,021 | | | |
| Propane | 971 | 78 | 1,810 | 3,154 |
| Butylenes | 2,363 | | | |
| Isobutane | 1,496 | 4,334 | 20,704 | 28,470 |
| Normal Butane | 2,341 | 143 | 2,000 | 2,000 |
| Alkylate | | | | 7,580 |

The above figures are in barrels per day, based on condensed liquids.

From the foregoing, it should be evident that there is provided in accordance with this invention an improved control system for an alkylation unit. This control system automatically supplies acid to the alkylation unit at a rate so as to maintain a desired amount of acid in the system. The invention is also useful in measuring the level of corrosive materials, such as hydrofluoric acid, in containers. This system eliminates the need for float elements or the like inside the tank. There are substantially no moving parts in the detecting element. The compression of the support bar is normally an extremely small fraction of an inch. However, even such a small change is readily detected by the bridge network. It should be evident that the invention is applicable to other systems, such as sulfuric acid alkylation units, for example.

While the invention has been described in conjunction with a present preferred embodiment, it should be evident that it is not limited thereto.

What is claimed is:

1. In a liquid acid alkylation unit wherein a mixture of olefins and isoparaffins is contacted by an acid catalyst in a reactor, the resulting product is transferred to an acid hydrocarbon settler, the hydrocarbon product is removed from the settler, and a portion of the acid is returned from the settler to the reactor, a control system to add fresh acid to the unit as required to compensate for acid losses which comprises a source of fresh acid, acid transfer means communicating between said source and said settler, flow inducing means in said acid transfer means, means to maintain the fluid level in said settler at a predetermined level so that the weight of the settler is representative of the acid level in said settler, a member supporting at least a part of the weight of the settler, a strain gauge attached to said member to provide a signal representative of the weight of the settler and thus the acid level therein, and automatic means responsive to said signal to control said flow inducing means to add acid to the settler from said source to maintain the acid level in the settler substantially at a predetermined level.

2. In a liquid acid alkylation unit wherein a mixture of olefins and isoparaffins is contacted by an acid catalyst in a reactor, the resulting product is transferred to an acid hydrocarbon settler, the hydrocarbon product is removed from the settler, and a portion of the acid is returned from the settler to the reactor, a control system to add fresh acid to the unit as required to compensate for acid losses which comprises means to maintain the settler full of fluid so that the weight of the settler is representative of the acid level in said settler, a tank of fresh acid, conduit means communicating between said tank and said settler, a pump in said conduit means to pass acid from said tank to said settler, means pivotally supporting one end of the settler, a member supporting the other end of said settler, a first strain gauge attached to said member so that the wires thereof extend primarily longitudinally of said stationary support, a second strain gauge attached to said member so that the wires thereof extend primarily transversely of said member, means to compare the resistances of said strain gauges to provide a signal representative of the weight of the settler and thus the acid level therein, automatic means responsive to said signal to control said pump to add acid to the settler to maintain the acid level in the settler substantially at a predetermined point, a second member supporting at least a part of the weight of said tank of fresh acid, a third strain gauge attached to said second member to provide a second signal representative of the weight of said tank and thus the amount of acid therein, and means to record said second signal to provide a record of the amount of acid in the tank and thus the amount of fresh acid added to the settler.

3. Apparatus for maintaining the amount of a first fluid in a container at a predetermined point, said container containing said first fluid and a second fluid, comprising means to maintain the total amount of fluid in said container substantially at a predetermined level so that the weight of said container is representative of the amount of said first fluid therein, a source of said first fluid, fluid transfer means communicating between said source and said container, flow inducing means in said fluid transfer means, a member supporting at least a part of the weight of said container, a weighing means attached to said member to provide a signal representative of the weight of said container and thus the amount of said first fluid therein, and automatic means responsive to said signal to control said flow inducing means to add an amount of said first fluid from said source to the container to maintain the amount of said first fluid in said container substantially at a predetermined point.

4. In a liquid acid alkylation unit wherein a mixture of olefins and isoparaffins is contacted by an acid catalyst in a reactor, the resulting product is transferred to an acid hydrocarbon settler, the hydrocarbon product is removed from the settler, and a portion of the acid is returned from the settler to the reactor, a control system to add fresh acid to the unit as required to compensate for acid losses which comprises means to maintain the settler full of fluid so that the weight of the settler is representative of the acid level in the settler, a tank of fresh acid, conduit means communicating between said tank and said settler, a pump in said conduit means to pass acid from said tank to said settler, a member supporting at least a part of the weight of the settler, a strain gauge attached to said member to provide a signal representative of the weight of said settler and thus the acid level therein, automatic means responsive to said signal to control said pump to add acid to the settler to maintain the acid level in the settler substantially at a predetermined point.

References Cited in the file of this patent
UNITED STATES PATENTS

| | | |
|---|---|---|
| 1,501,124 | Loffler | July 15, 1924 |
| 2,246,703 | Thiele et al. | June 24, 1941 |
| 2,460,503 | Howe | Feb. 1, 1949 |
| 2,472,047 | Ruge | May 31, 1949 |
| 2,582,886 | Ruge | Jan. 15, 1952 |
| 2,592,223 | Williams | Apr. 8, 1952 |
| 2,601,166 | Myers | June 17, 1952 |
| 2,694,171 | Campbell | Nov. 9, 1954 |
| 2,766,104 | Gilmore | Oct. 9, 1956 |
| 2,782,620 | Roth | Feb. 26, 1957 |